Feb. 6, 1951
C. B. SPASE
2,540,463
AXIALLY ENGAGING CLUTCH
Filed Nov. 26, 1945
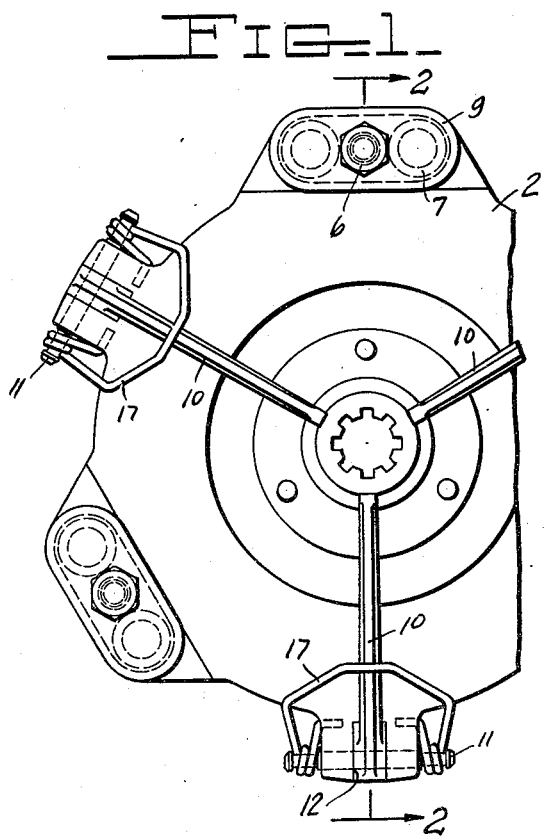
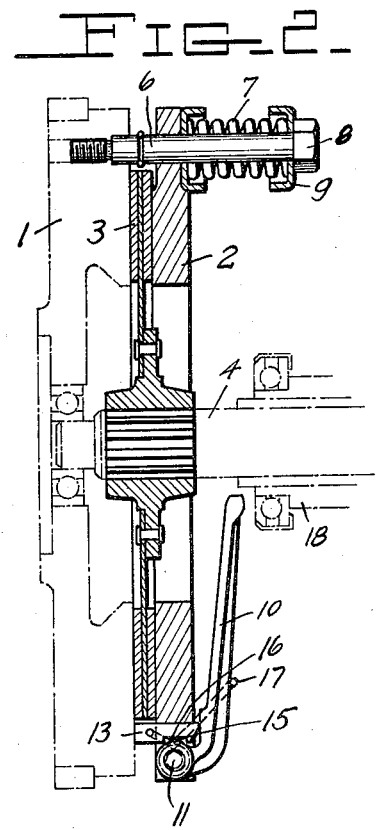
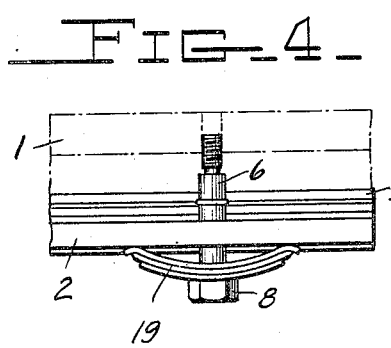
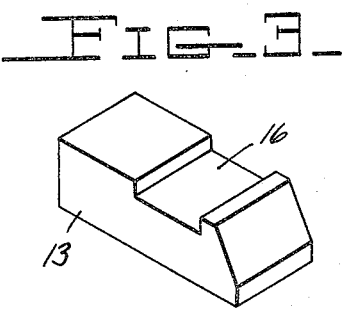
INVENTOR:
CHARLES B. SPASE,
BY Bodell & Thompson
ATTORNEYS.

Patented Feb. 6, 1951

2,540,463

UNITED STATES PATENT OFFICE 2,540,463

AXIALLY ENGAGING CLUTCH

Charles B. Spase, Nedrow, N. Y., assignor to Lipe-Rollway Corporation, Syracuse, N. Y., a corporation of New York Application November 26, 1945, Serial No. 630,871

3 Claims. (Cl. 192—68)

This invention relates to friction clutches, and has for its object a clutch which embodies a pressure ring, supports as studs therefor by which it is attached to a complemental clutch element and rotates therewith, usually the fly wheel of an engine, or a disk on a shaft driven by the engine, and clutch springs located on the outer side of the pressure ring and thrusting in opposite directions against the pressure ring and heads or spring shoulders on the outer ends of the studs, and clutch levers supported solely by the pressure ring and operating sliding motion transmitting thrust members carried by the pressure ring and extending transversely therethrough to slidably engage and press at like ends against the complemental clutch element to disengage the clutch during the throw-out operations of the levers.

The invention further has for its object a pressure ring in which the inner and outer faces are duplicates, so that when the one pressure face becomes worn or scored, the pressure ring can be reversed and the levers and the thrust members also reversed.

The invention further has for its object a pressure ring for use in clutches or friction devices in which the pressure face and also the face on the opposite side of the ring is finished smooth, that is, machine finished, so that the remainder of the ring throughout its thickness is homogeneous throughout, as to the grain structure or texture or density, in order that the heat generated during the use of the ring in a clutch or frictional apparatus is distributed equally by conduction throughout the ring, and hence warping of the ring, due to localized heating, is avoided. The ring is also preferably symmetrical in cross-section with respect to the median plane at a right angle to the axis of the ring.

A clutch is shown and described, although the features are applicable to any frictional device, as brakes, etc. The term "clutch" is used for the sake of convenience and brevity.

In friction clutches, the springs are usually coiled springs, and in some clutches, an annular series of coiled springs. When an annular series of coiled springs is used, the studs on which the springs act extend considerable distance beyond the rear face of the pressure ring and a back plate, when a back plate is used, to such an extent that the clutch can not be used in some standard bell housings. The invention further has for its object a spring arrangement, wherein bowed or leaf springs are used which take up little space in an axial direction, and hence can be readily used in all types of bell housings. The use of bowed or leaf springs, as clutch springs also has other advantages.

The invention consists in the novel features and in the combinations and constructions hereinafter set forth and claimed.

In describing this invention, reference is had to the accompanying drawings in which like characters designate corresponding parts in all the views.

Figure 1 is a fragmentary rear elevation of this clutch, the throw-out collar and the clutch shaft being removed.

Figure 2 is a sectional view taken on the plane of line 2—2, Figure 1, the fly wheel, clutch shaft and throw-out collar being shown in broken lines.

Figure 3 is a detail view of one of the thrust members.

Figure 4 is a fragmentary view showing the clutch springs as an annular series of flat or bowed springs.

The unitary clutch element comprises a pressure ring or annular disk, means for attaching the pressure ring to the fly wheel or analogous part, which means also serve as driving lugs to rotate the pressure ring with the fly wheel or analogous part, constituting the complemental element of the clutch. springs carried by the supporting means on the outer side of the pressure ring and thrusting in opposite directions against the outer face of the pressure ring and heads on the supporting means, in order to press the pressure ring toward the complemental element to engage the clutch (it being understood that the other element, as the driven element of the clutch, is a plate or disk extending between the fly wheel and the pressure ring), radially extending throw-out levers pivoted at their outer ends to the rim of the pressure ring, so that they are carried solely by the pressure ring, and sliding motion transmitting thrust members also carried by the pressure ring and coacting with the levers at their outer ends at points eccentric to the fulcrums of the levers, and at their inner ends thrusting against the face of the complemental element during the throw-out operations of the levers to disengage the clutch.

I designates one element or one section of a clutch, as the driving element, which is usually the fly wheel of an engine. 2 designates the pressure ring of the unitary clutch element, and 3 a friction disk or plate which is usually the driven section of the clutch, it being usually splined on a clutch shaft 4 axially alined with the fly wheel or drive shaft and mounted in any suitable manner. The driven disk or plate has pressure faces on opposite sides thereof opposed to the pressure plate on the element or fly wheel 1 and on the pressure ring 2.

The supporting means of the unitary structure is here shown as a series of studs 6 extending through openings in the outer margins of the pressure ring and threading into or anchored in the fly wheel, the pressure ring being slidably mounted on the stud.

7 designates the clutch springs for pressing the pressure ring to compress the plate 3 between the pressure ring and the fly wheel. In Figures 1 and 2, the springs 7 are shown as coiled springs located on opposite sides of each stud and thrusting at like ends against the outer face of the pressure ring 2 and at the other ends against a spring abutment or yoke 9 on the stud which thrusts against the head 8 on the stud. There are two springs for each stud.

10 designates the throw-out levers pivoted at their outer ends at 11 to the rim of the pressure ring, the ring being shown as provided with radial slots 12 in which the outer ends of the levers extend and are pivoted.

13 designates motion transmitting thrust members extending transversely through the pressure ring 2 and guided in suitable passages therein, these thrust members thrusting at like ends against the face of the complemental element or fly wheel 1 during the throwing out operation, and slidably engaging without interlocking therewith, and at their outer ends receive thrust from the levers 10. The thrust members coact with the levers 10 at points inward radially from the pivots 11 of the levers. There is one thrust member for each lever, and each lever and its thrust member are interlocked by a lost motion connection, as a pin-and-slot connection, so that the thrust members normally have a floating action relative to the levers or the hubs thereof. As here shown, the hubs of the levers are formed with radial projections or points 15, which extend into elongated notches 16 in the sides of the thrust members toward the axes of the levers. The thrust members are non-circular, as rectangular in cross-section. Each lever is acted upon by a spring 17 which acts to oppose or balance the centrifugal force of the levers during rotation, which centrifugal force tends to throw the inner ends of the levers radially outward. Hence, the springs not only oppose this tendency but hold the inner ends of the levers away from the throwout collar 18, when the clutch is engaged. As these springs tend also to oppose the clutch springs 7, the clutch springs 7 are initially adjusted or loaded a trifle more than if the springs 17 were not used, in order to compensate for the opposition of the springs 17.

In Figure 4, the clutch springs are shown as bow springs 19 instead of coiled springs, the ends of the bow springs pressing against the outer face of the pressure ring 2 and their intermediate portions thrusting against heads on the studs 6. When the bow or leaf springs are used, there is one spring for each stud instead of a pair of coiled springs for each stud, as in Figures 1 and 2. This construction, as before pointed out, permits a clutch of this type to be installed in bell housings so shaped that a clutch with a greater over-all axial length of coiled springs can not be used.

The pressure plate or ring 2 has pressure faces on opposite sides thereof, that is, the front and rear sides of the pressure ring are duplicates. Thus, when during the use of the clutch, one face becomes rough, scored and unfit for use, the pressure plate can be reversed. This reversal also requires reversal of the levers 10 from one side to the other of the pressure ring, because of the sliding motion transmitting thrust members.

The pressure faces on opposite sides of the pressure ring 2 are smoothed off or machine finished. In forming or casting the ring 2, these outer surfaces are on a skin which has a different texture from the body or core of the ring, and hence in pressure or friction rings, the heat generated when the clutch is in use, does not distribute evenly throughout the pressure ring and dissipated, if the faces or skin are left on the ring. The unequal heating of the different areas of the pressure ring results in warping and other untoward conditions tending to render the ring useless or inefficient. By smooth finishing these faces by removing or cutting or machining off the skin, the ring is then homogeneous throughout in regard to its texture and density or grain structure, and hence the heat conductivity is uniform, so that the heat generated at the friction face is distributed quickly and evenly, throughout the ring, and dissipated, thus avoiding warping. Also, to facilitate the equal conductivity and distribution of the heat, the ring is symmetrical in cross-section along a median plane at a right angle to the axis of the ring.

What I claim is:

1. A unitary friction clutch element for attachment to a complemental clutch element, the unitary element including a shiftable pressure ring, means for supporting and driving the pressure ring from and attaching the same to the complemental element, springs thrusting in opposite directions against the pressure ring and the supporting means to engage the clutch, and throw-out mechanism including throw-out levers carried solely by the pressure ring and motion transmitting thrust members between the levers and the complemental element, said members being carried solely by the pressure ring, movable transversely thereof, and thrusting endwise against the complemental element during the throw-out operation of the levers, the levers and said members having interlocking portions for preventing dislodgment of said members.

2. A unitary friction clutch element for attachment to a complemental clutch element, the unitary element including a shiftable pressure ring, means for supporting and driving the pressure ring from and attaching the same to the complemental element, springs thrusting in opposite directions against the pressure ring and the supporting means to engage the clutch, and throw-out mechanism including throw-out levers carried solely by the pressure ring, and sliding thrust members extending transversely through the pressure ring beyond the opposite faces and thrusting endwise at like ends against the complemental element and slidably engaging the levers respectively at their other ends, the levers being formed with projections radial with their axes and said members having elongated notches in their sides toward the levers for receiving the radial projections.

3. A unitary friction clutch element for attachment to a complemental clutch element, the unitary element including a shiftable pressure ring, means for supporting and driving the pressure ring from and attaching the same to the complemental element, springs thrusting in opposite directions against the pressure ring and the supporting means to engage the clutch, and throw-out mechanism including throw-out levers carried solely by the pressure ring, and sliding thrust members extending transversely through the pressure ring beyond the opposite faces and thrusting endwise at like ends against the complemental element and slidably engaging the levers respectively at their other ends, the levers and said members being connected together by a lost motion connection permitting sliding and floating movement of the members relatively to the levers.

CHARLES B. SPASE.

REFERENCES CITED

The following references are of record in the file of this patent:

UNITED STATES PATENTS

| Number | Name | Date |
| --- | --- | --- |
| 1,848,887 | Hughes | Mar. 8, 1932 |
| 2,031,311 | Harris | Feb. 18, 1936 |
| 2,077,154 | Pearmain | Apr. 13, 1937 |
| 2,126,149 | Spase | Aug. 9, 1938 |
| 2,174,317 | Dunkelow | Sept. 26, 1939 |
| 2,453,945 | Spase | Nov. 16, 1948 |